United States Patent
Ono et al.

(10) Patent No.: US 7,599,526 B2
(45) Date of Patent: Oct. 6, 2009

(54) IMAGING SYSTEM AND PROGRAM FOR DETECTING A MOVEMENT OF A SUBJECT AND INITIALIZING IMAGING DEVICES TO PERFORM SUBJECT AUTHENTICATION BASED ON THE MOVEMENT

(75) Inventors: Shuji Ono, Kanagawa (JP); Toshihiko Kaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 611 days.

(21) Appl. No.: 10/932,343

(22) Filed: Sep. 2, 2004

(65) Prior Publication Data
US 2005/0089198 A1    Apr. 28, 2005

(30) Foreign Application Priority Data
Sep. 2, 2003   (JP) ............................. 2003-309957
Aug. 20, 2004  (JP) ............................. 2004-241543

(51) Int. Cl.
*G06K 9/00* (2006.01)

(52) U.S. Cl. .................. 382/118; 382/103; 382/115; 382/117; 340/5.8; 340/5.81; 340/5.82; 340/5.83; 348/208.14; 348/169

(58) Field of Classification Search ............... 382/118
See application file for complete search history.

(56) References Cited

U.S. PATENT DOCUMENTS

| | | | | |
|---|---|---|---|---|
| 4,768,088 A | * | 8/1988 | Ando | 348/77 |
| 5,859,921 A | * | 1/1999 | Suzuki | 382/118 |
| 5,991,429 A | * | 11/1999 | Coffin et al. | 382/118 |
| 6,332,038 B1 | * | 12/2001 | Funayama et al. | 382/190 |
| 6,404,987 B1 | * | 6/2002 | Fukui | 396/56 |
| 6,430,306 B2 | * | 8/2002 | Slocum et al. | 382/118 |
| 6,754,389 B1 | * | 6/2004 | Dimitrova et al. | 382/224 |
| 6,983,061 B2 | * | 1/2006 | Ikegami et al. | 382/115 |
| 7,158,657 B2 | * | 1/2007 | Okazaki et al. | 382/118 |
| 7,227,569 B2 | * | 6/2007 | Maruya | 348/143 |
| 2005/0063566 A1 | * | 3/2005 | Beek et al. | 382/115 |

* cited by examiner

*Primary Examiner*—Brian Q Le
*Assistant Examiner*—Edward Park
(74) *Attorney, Agent, or Firm*—Sughrue Mion, PLLC

(57) ABSTRACT

An imaging system is provided which can efficiently capture an authentication image of a subject by an imaging device provided around a position toward which the subject is moving. The imaging system includes; a plurality of imaging devices, provided at different positions, respectively, for capturing moving images; a direction detection unit for detecting the moving direction of the subject based on the moving image in which the subject is contained; a selection unit for selecting one of the imaging devices, that is to capture the authentication image of the subject based on the moving direction thus detected and the positions of the imaging devices; and a storage unit for storing the authentication image captured by the selected imaging device.

39 Claims, 12 Drawing Sheets

IMAGE FOR AUTHENTICATION

COMPARED IMAGE

IMAGING SYSTEM AND PROGRAM FOR DETECTING A MOVEMENT OF A SUBJECT AND INITIALIZING IMAGING DEVICES TO PERFORM SUBJECT AUTHENTICATION BASED ON THE MOVEMENT

This patent application claims priority from Japanese patent applications Nos. 2003-309957 filed on Sep. 2, 2003 and 2004-241543 filed on Aug. 20, 2004, the contents of which are incorporated herein by reference.

BACKGROUND OF THE INVENTION

1. Field of the Invention

The present invention relates to an imaging system for imaging a subject. More particularly, the present invention relates to an imaging system for capturing an image of a subject, that is to be used in authentication of the subject.

2. Description of the Related Art

As a conventional means for authenticating a person, a system is known in which authentication is carried out by capturing an image of the person and comparing the captured image with images of people registered in advance. For example, an image of a visitor is captured at an entrance of a room or the like, and authentication is carried out in order to check whether or not that visitor is a registered person, thereby deciding whether to allow that visitor to enter the room or not. Alternatively, an image of an unspecified person is captured by means of a security camera or the like, and it is then determined whether or not that person is registered.

However, in the conventional system, the visitor has to wait for completion of imaging and authentication of the visitor, because both the imaging and the authentication are carried out at the entrance or the like, i.e., in an area where the visitor wants to pass through. Moreover, as the number of registered people increases, a time required for completing authentication also increases. Thus, authentication cannot be carried out efficiently. In order to shorten the time required for authentication in the conventional system, authentication should be simplified. Thus, in the conventional system, accuracy and efficiency of authentication cannot be improved simultaneously. In addition, in a case where a person who is imaged by a security camera or the like is not aware of authentication, it was difficult to capture an image suitable for authentication, such as an image of a front view.

SUMMARY OF THE INVENTION

Therefore, it is an object of the present invention to provide an imaging system and a program, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an imaging system for imaging a subject, comprises: a plurality of imaging devices, provided at different positions, respectively, operable to image the subject; a direction detection unit operable to detect a moving direction of the subject based on two or more images of the subject taken at different times by one of the plurality of imaging devices; a selection unit operable to select one of the plurality of imaging devices, that is to capture an authentication image of the subject, based on the moving direction detected by the direction detection unit and the positions of the plurality of imaging devices; and a storage unit operable to store the authentication image captured by the selected one of the plurality of imaging devices.

The imaging system may further comprise an authentication unit operable to authenticate the subject based on the authentication image stored in the storage unit. The selected imaging device may capture a still image of the subject as the authentication image.

The plurality of imaging devices may include a plurality of imaging devices for movement detection and a plurality of imaging devices for authentication, the imaging devices for movement detection having imaging directions that are parallel to a downward direction, the imaging devices for authentication having imaging directions that are inclined with respect to the downward direction; the direction detection unit may detect the moving direction of the subject based on images of the subject captured by the plurality of imaging devices for movement detection; and the selection unit may select one of the plurality of imaging devices for authentication, that is to capture the authentication image of the subject.

The direction detection unit may select whether to detect the moving direction of the subject imaged by the plurality of imaging devices based on whether or not the subject is a subject that was registered in advance. The, selection unit may select a first imaging device operable to capture a first authentication image of the subject and a second imaging device operable to capture a second authentication image from the plurality of imaging devices based on the moving direction of the subject, the second imaging device being provided behind the first imaging device in the moving direction.

The second imaging device may image the subject with a larger amount of information than the first imaging device. The authentication unit may carry out primary authentication of the subject based on the first authentication image captured by the first imaging device and carry out secondary authentication of the subject based on the second authentication image captured by the second imaging device, the secondary authentication being more accurate than the primary authentication.

The direction detection unit may detect the moving direction of the subject based on change of a position of the subject in the moving image captured by any one of the imaging devices. The direction detection unit may detect the moving direction of the subject based on change in size of the subject in the plurality of images captured by any one of the imaging devices.

The selection unit may detects a frontal direction of the subject based on the moving direction detected by the direction detection unit and selects one of the plurality of imaging devices, that is able to image a front view of the subject, based on the positions of the plurality of imaging devices.

The selection unit may select the one imaging device that is able to image the front view of the subject further based on imaging directions of the imaging devices. The selection unit may control an imaging direction of the selected imaging device to image the front view of the subject.

The imaging system may further comprise a decision unit operable to determine whether or not the authentication image contains a front view of a facial region of the subject, wherein the authentication unit carries out authentication of the subject based on the authentication image in a case where the decision unit determined that the authentication image contained the front view of the facial region of the subject. The decision unit may delete the authentication image stored in the storage unit in a case where the decision unit determined that no front view of the facial region of the subject was contained in the authentication image.

The imaging system may further comprise a comparison unit operable to compare the first authentication image with the second authentication image and, in a case where the subject in the first authentication image and the subject in the second authentication image are the same, associate the first authentication image and the second authentication image with each other, wherein the second authentication unit determines the subject based on the second authentication image from candidates extracted by the first authentication unit based on the first authentication image associated with the second authentication image.

The first imaging device may further capture a first compared image of the subject containing an area wider than an area in the second authentication image, to correspond to the first authentication image; the second imaging device may further capture a second compared image of the subject containing an area wider than the area in the second authentication image, to correspond to the second authentication image; the imaging system may further comprise a comparison unit operable to compare the first compared image and the second compared image and, in a case where the subject in the first compared image is the same as the subject in the second compared image, associate the first authentication image corresponding to the first compared image and the second authentication image corresponding to the second compared image with each other; and the second authentication unit may determine the subject based on the second authentication image from candidates extracted by the first authentication unit based on the first authentication image associated with the second authentication image.

In a case where a plurality of subjects are imaged in the first authentication image, the first authentication unit may extract candidates for each of the subjects, the imaging system may further comprise a comparison unit operable to associate each of the subjects in the first authentication image with the subject in the second authentication image based on the first authentication image and the second authentication image, and the second authentication unit may determine the subject based on the second authentication image from the candidates extracted by the first authentication unit for the subject in the first authentication image who is associated with the subject in the second authentication image.

The second imaging device may include: a flash operable to emit light toward the subject at a plurality of positions; and a flash controller operable to control a position at which the flash emits the light based on a result of the authentication by the first authentication unit. The flash controller may further control the intensity of the light emitted by the flash based on the result of the authentication by the first authentication unit.

The second imaging device may capture the second authentication image for each subject. The first authentication unit may detect brightness in the first authentication image, and the flash controller may control the position at which the flash emits the light based on the brightness in the first authentication image. The first authentication unit may detect brightness in the first authentication image, and the flash controller may control the intensity of the light emitted by the flash based on the brightness in the first authentication image.

The first authentication unit may detect brightness in a region of the first authentication image, that corresponds to a region of the subject used in the authentication by the second authentication unit, and the flash controller may control the position at which the flash emits the light based on the brightness in that region of the first authentication image. Moreover, the first authentication unit may detect brightness in a region of the first authentication image, that corresponds to a region of the subject used in the authentication by the second authentication unit, and the flash controller may control the intensity of the light emitted by the flash based on the brightness in that region of the first authentication image.

The first authentication unit may detect contrast in a region of the first authentication image, that corresponds to a region of the subject used in the authentication by the second authentication unit, and the flash controller may control the position at which the flash emits the light based on the contrast in that region of the first authentication image. Moreover, the first authentication unit may detect contrast in a region of the first authentication image, that corresponds to a region of the subject used in the authentication by the second authentication unit, and the flash controller may control the intensity of the light emitted by the flash based on the contrast in that region of the first authentication image.

The second imaging device may be able to image the subject from a plurality of heights, the first authentication unit may detect a position of the subject in the first authentication image, and the second imaging device may calculate a height from which the second imaging device is to image the subject based on the position of the subject detected by the first authentication unit, and images the subject from the calculated height to obtain the second authentication image.

The first authentication unit may detect an angle at which the first imaging device imaged the subject based on the first authentication image, and the second imaging device may calculate an angle at which the second imaging device is to image the subject based on the angle detected by the first authentication unit, and images the subject at the calculated angle to obtain the second authentication image.

The second authentication unit may includes: a registered image database operable to store for each subject a plurality of registered images taken under different lighting conditions in advance; a position calculation unit operable to calculate a position of the subject when the second imaging device images the subject based on the first authentication image; a lighting condition calculation unit operable to calculate a lighting condition when the second imaging device images the subject based on the position of the subject calculated by the position calculation unit; a registered image selection unit operable to select one of the plurality of registered images from the registered image database in accordance with the lighting condition calculated by the lighting condition calculation unit; and a decision unit operable to carry out the secondary authentication of the subject using the selected registered image.

The first imaging device may image a front view of the subject as the first authentication image, and the second imaging device may image the subject at an angle different from an angle of the first imaging device to obtain the second authentication image. Moreover, the first imaging device may image the subject in a direction approximately parallel to a path of the subject to obtain the first authentication image, and the second imaging device may image the subject at an angle different from an angle of the first imaging device to obtain the second authentication image.

The first imaging device may include a color filter in which adjacent pixels have different colors to obtain a color image as the first authentication image, and the second imaging device may include no color filter to obtain a monochrome image as the second authentication image. The imaging system may comprise a plurality of second imaging devices operable to capture second authentication images of the subject at different angles, respectively, and the second authentication unit may carry out the secondary authentication of the subject based on the second authentication images respectively captured by the second imaging devices.

The second authentication unit may include: a coincidence calculation unit operable to calculate a degree of coincidence between the subject and each of candidates based on the second authentication image; a characteristic acquisition unit operable to, in a case where there are a plurality of candidates each having the calculated degree of coincidence equal to or larger than a predetermined value, acquire a characteristic of the subject that is different from a characteristic in the second authentication image; and a decision unit operable to determine the subject from the plurality of candidates each having the calculated degree of coincidence equal to or larger than the predetermined value based on the characteristic of the subject acquired by the characteristic acquisition unit.

The second authentication unit may further include: a characteristic storage unit operable to store for each of the candidates a plurality of authentication characteristics and a characteristic amount of each of the authentication characteristics in advance in such a manner that each of the authentication characteristics and its characteristic amount are associated with each other; and a characteristic selection unit operable to select one of the plurality of authentication characteristics that is associated with the characteristic amount having a maximum variance between the plurality of candidates each having the calculated degree of coincidence equal to or larger than the predetermined value, and wherein the characteristic acquisition unit acquires the characteristic of the subject in accordance with the one of the authentication characteristics selected by the characteristic selection unit.

According to the second aspect of the present invention, a program for making an imaging system for imaging a subject work, wherein the program makes the imaging system work as: a plurality of imaging devices, respectively provided at different positions, operable to image the subject; a direction detection unit operable to detect a moving direction of the subject based on two or more images of the subject taken at different times by one of the plurality of imaging devices; a selection unit operable to select one of the plurality of imaging devices, that is to capture an authentication image of the subject, based on the moving direction detected by the direction detection unit and the positions of the plurality of imaging devices; and a storage unit operable to store the authentication image captured by the selected one imaging device.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

According to the present invention, it is possible to efficiently capture an authentication image of a subject by an imaging device provided at a position toward which the subject is moving. Moreover, the front view of the subject can be easily imaged and authentication is carried out based on the image of the front view of the subject. Therefore, authentication of the subject can be carried out with high accuracy.

BRIEF DESCRIPTION OF THE DRAWINGS

FIG. 7A shows an example of the second authentication image; and FIG. 7B shows an example of the first or second compared image.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
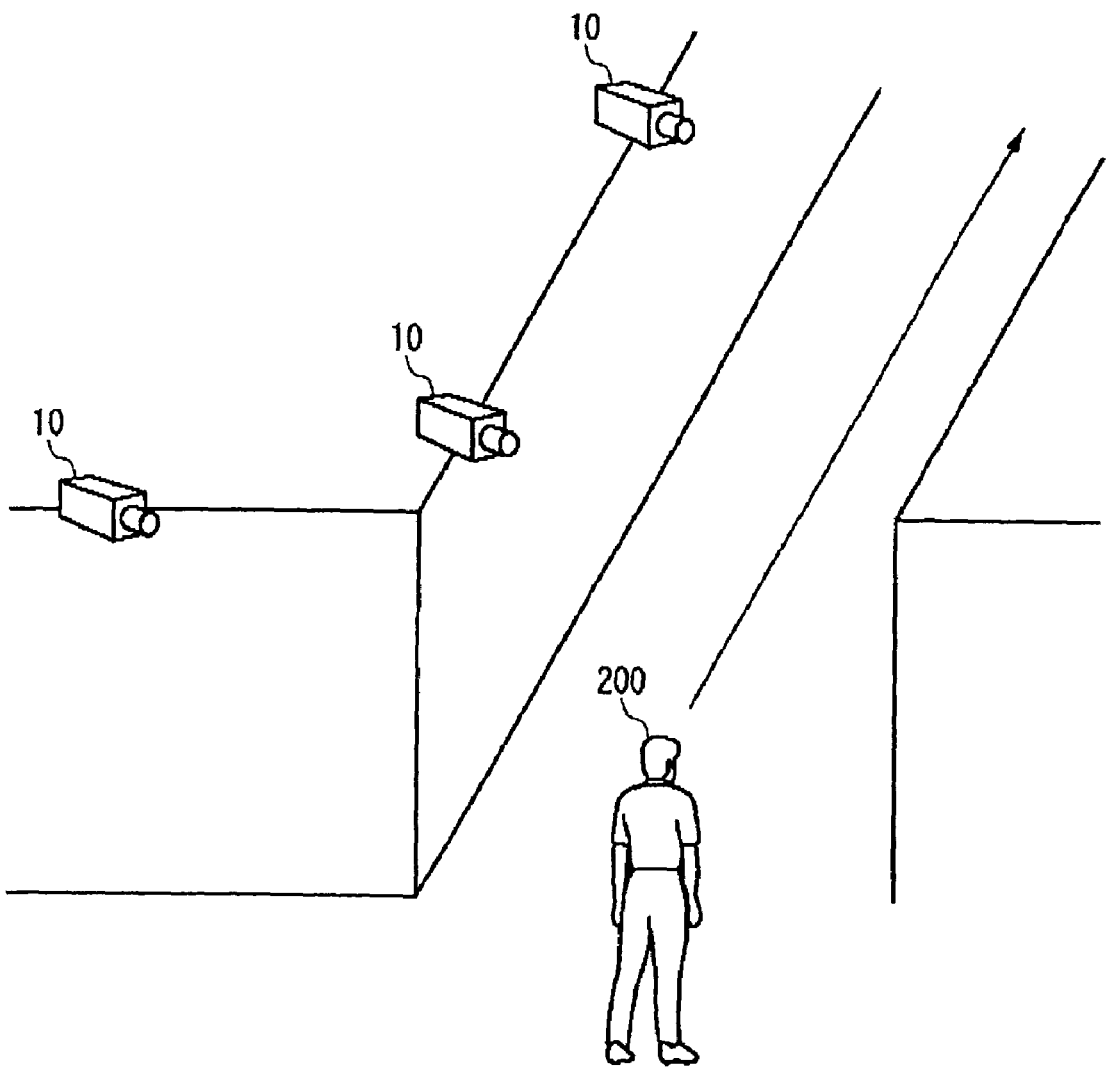
FIG. 1 generally illustrates an imaging system according to the present invention.

FIG. 1 is a general diagram of an exemplary imaging system according to the present invention. This imaging system includes a plurality of imaging devices 10 for imaging a subject 200 and carries out authentication of the subject 200 based on the images captured by the imaging devices 10. Imaging directions of the imaging devices 10 are respectively determined in advance. The imaging devices 10 capture images in the predetermined imaging directions from different positions, respectively. The imaging device 10 may be a device for capturing a moving image and a still image. The imaging system detects a moving direction of the subject based on the captured moving image of the subject and then makes the imaging device 10 that corresponds to the moving direction of the subject 200 capture a still image of the subject 200 as an authentication image. For example, the imaging system selects the imaging device 10 provided at a position where a front view of the subject can be imaged, and makes the selected imaging device 10 image the subject.

Figure 2:
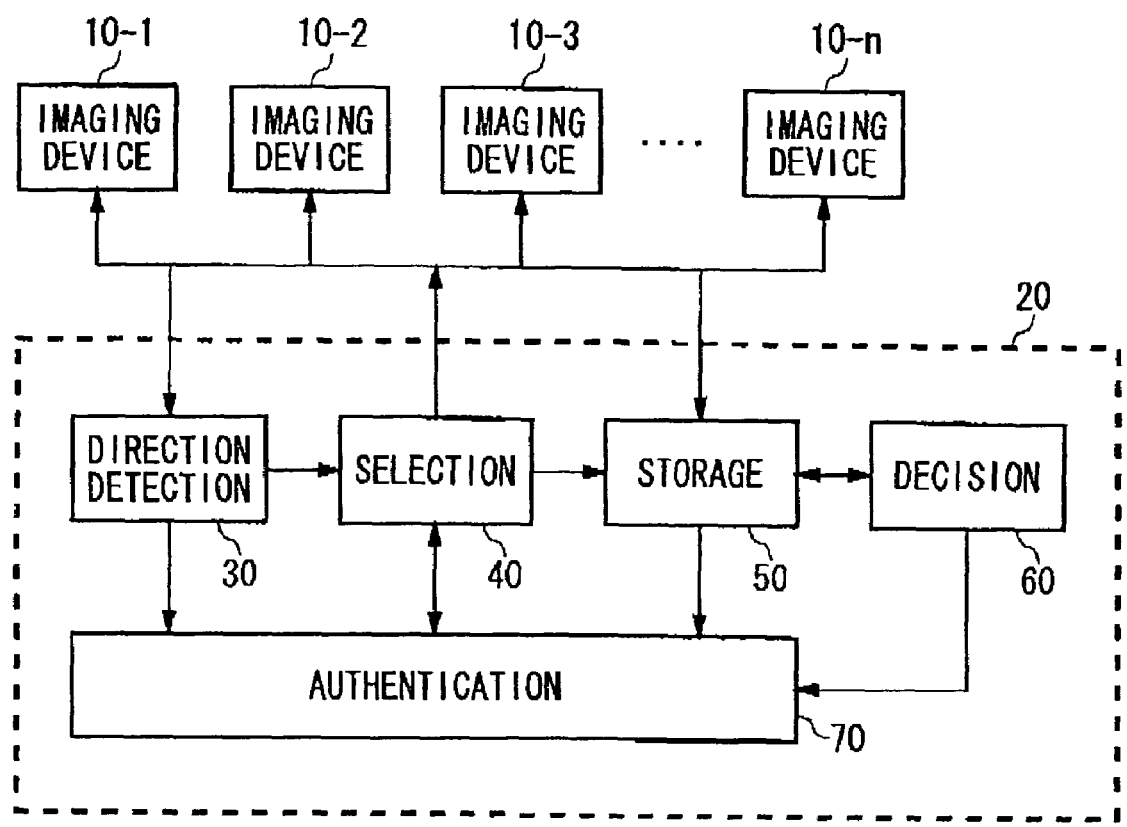
FIG. 2 is a diagram of an exemplary structure of an imaging system 100 according to an embodiment of the present invention.

FIG. 2 is a diagram of an exemplary structure of an imaging system 100 according to an embodiment of the present invention. The imaging system 100 includes a plurality of imaging devices (10-1, . . . 10-n, hereinafter, labeled with 10 generically) and a controller 20. The imaging devices 10 capture images in predetermined imaging directions from different positions, respectively, as described before.

The controller 20 is connected to each of the imaging devices 10 and includes a direction detection unit 30, a selection unit 40, a storage unit 50, a decision unit 60 and an authentication unit 70. The direction detection unit 30 receives moving images respectively captured by the imaging devices 10 and detects a moving direction of a subject 200 based on one of the received moving images which contains the subject 200. For example, the direction detection unit 30 may process the moving image captured by the imaging devices 10, which contains an object that changed its position, as a moving image containing the subject 200. In this case, the direction detection unit 30 may process the object that changed its position as the subject 200.

The direction detection unit 30 may detect the moving direction of the subject 200 from change of the position of the subject 200 in the moving image captured by that imaging device 10 or based on change in the size of the subject 200 in the moving image. In a case where the subject 200 gradually becomes larger in a certain moving image, for example, it can be determined that the subject 200 moves toward the imaging device 10 that captured that moving image.

Moreover, in a case where a plurality of imaging devices 10 imaged the same subject 200 simultaneously, it is preferable that the direction detection unit 30 detects the moving direction of the subject 200 based on a plurality of moving images captured by those imaging devices 10. Since the positions and imaging directions of the respective imaging devices 10 are known, it can be determined whether or not the subjects imaged by a plurality of imaging devices 10 simultaneously are the same by calculating positions of the respective subjects based on the positions and imaging directions of the respective imaging devices 10. The moving direction of the subject 200 can be detected more accurately by using a plurality of moving images respectively captured by a plurality of imaging devices 10.

The selection unit 40 selects one of a plurality of imaging devices 10 that is to capture an authentication image of the subject 200 based on the moving direction of the subject 200 detected by the direction detection unit 30 and the positions at which the respective imaging devices 10 are provided. For example, the selection unit 40 calculates a position to which the subject 200 will move based on the position(s) of the imaging device(s) 10 that imaged the subject 200 and the moving direction of the subject 200, and then selects the imaging device 10 provided near the calculated position.

The selection unit 40 may select the imaging device 10 for capturing the authentication image further based on the imaging directions of the respective imaging devices 10. For example, the selection unit 40 detects a frontal direction of the subject 200 from the moving direction of the subject 20 and then selects the imaging device 10 that is to image the subject 200 toward the front of the subject 200. The selection unit 40 preferably includes a database in which the positions and imaging directions of the respective imaging devices 10 were stored in advance. Moreover, the selection unit 40 may control the imaging direction of the selected imaging device so as to image the front view of the subject 200.

Then, the imaging device 10 selected by the selection unit 40 captures an authentication image of the subject 200. This imaging device 10 preferably captures the authentication image that contains an enlarged region of the subject 200. For example, the imaging device 10 may image a face, an eye, a nose, an ear, a mouth, or the like while enlarging it.

The storage unit 50 receives the authentication image captured by the imaging device 10 selected by the selection unit 40, and stores it therein. The storage unit 50 may store imaging-device identification information for identifying the imaging device 10 that captured the authentication image in such a manner that the information is associated with the authentication image. In this case, the selection unit 40 notifies the storage unit 50 of information indicating which imaging device 10 was selected. Moreover, the storage unit 50 may store a date and a time when the authentication image was captured so as to be associated with the authentication image. In this case, the imaging device 10 that captured the authentication image notifies the storage unit 50 of the capturing date and time.

The authentication unit 70 carries out authentication of the subject 200 based on the authentication image stored in the storage unit 50. The authentication unit 70 has registered images of people who are to be authenticated, that were supplied in advance, and compares the authentication image with the registered images, thereby identifying the subject 200.

The decision unit 60 determines whether or not the authentication image stored in the storage unit 50 contains the front view of the facial region of the subject 200. In a case where it was determined that the authentication image contained the front view of the face, the authentication unit 70 may carry out authentication of the subject 200 based on that authentication image. In a case where it was determined that the authentication image did not contain the front view of the facial region of the subject 200, the decision unit 60 may delete that authentication image stored in the storage unit 50 so as not to allow the authentication unit 70 to carry out authentication. In this case, the decision unit 60 may notify the selection unit 40 that authentication was not performed based on that authentication image, thereby causing the selection unit 40 to select the imaging device 10 that is to capture a new authentication image.

The direction detection unit 30 may select whether to detect the moving direction of the subject 200, based on whether or not the subject 200 imaged by the imaging device 10 is a subject that was registered in advance. For example, the direction detection unit 30 may detect the moving direction of the subject 200 in a case where the imaged subject 200 is a registered subject.

According to the imaging system 100 of this example, an authentication image can be captured efficiently by the imaging device provided around the position toward which the subject 200 will move. Moreover, the front view of the subject 200 can be easily imaged. In addition, since authentication is carried out based on the image of the front view of the subject 200, authentication of the subject 200 can be carried out with high accuracy. In a case where the image for authentication is not the image of the front view of the subject 200, authentication is not carried out. Therefore, efficiency of authentication can be improved.

In this example, the controller 20 includes the direction detection unit 30 and the selection unit 40. Alternatively, each imaging device 10 includes the direction detection unit 30 and the selection unit 40. In this case, each imaging device 10 detects the moving direction of the subject 200 that was imaged, and instructs the other imaging device 10 to capture the image for authentication.

Figure 3:
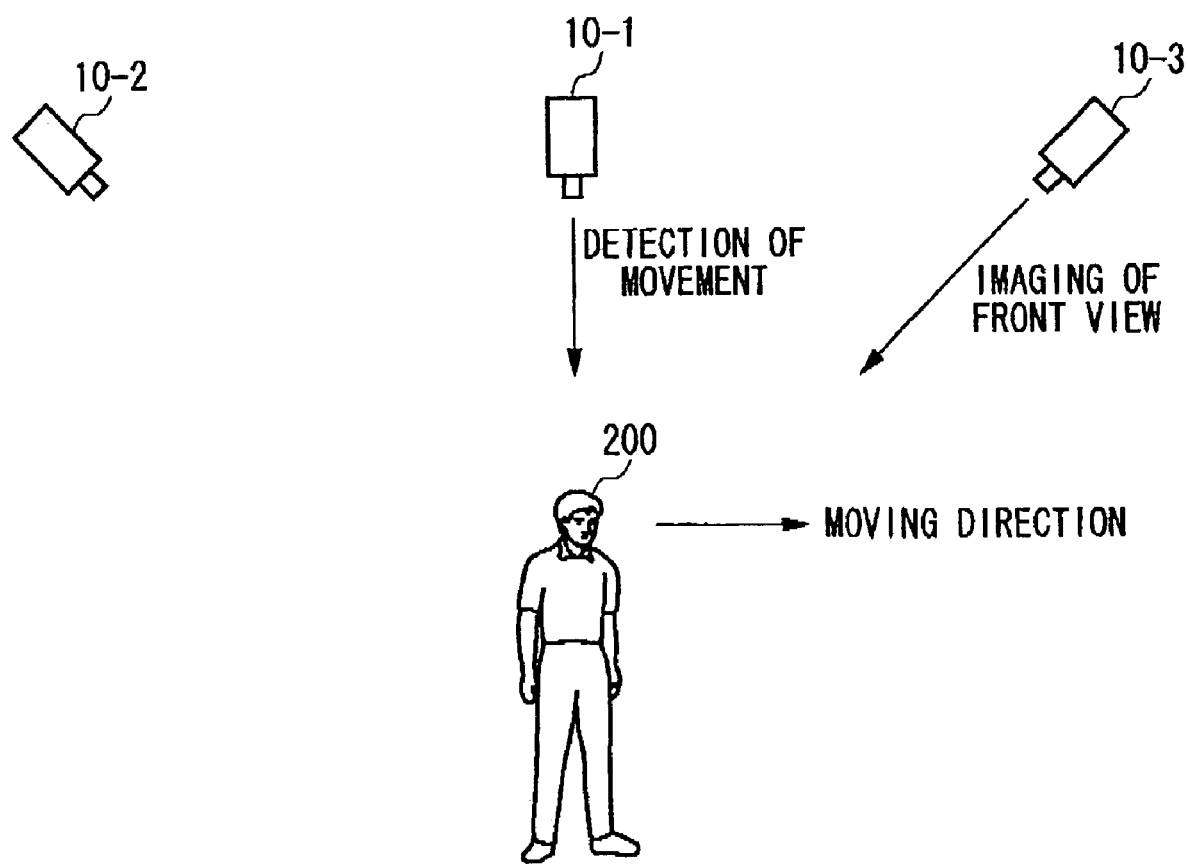
FIG. 3 shows an example of a plurality of imaging devices 10.

FIG. 3 illustrates an example of a plurality of imaging devices 10. In this example, the imaging devices 10 include a plurality of imaging devices for movement detection, that faces directly below and therefore imaging directions thereof are downward direction, such as an imaging device 10-1, and a plurality of imaging devices for authentication in which imaging directions are inclined with respect to the downward direction, such as an imaging device 10-3. The imaging device 10 for movement detection images the subject 200 in the downward direction from a position higher than the head of the subject 200. Please note that the downward direction in this description means a direction that is perpendicular to a plane in which the subject 200 moves and that extends from above that plane toward that plane. Moreover, the imaging device for authentication images the subject 200 from a position lower than the position of the imaging device for movement detection in the imaging direction that is closer to the horizontal direction than the imaging direction of the imaging device for movement detection. Please note that the horizontal direction in this description means a direction parallel to the aforementioned plane in which the subject 200 moves, for example.

The direction detection unit 30 detects the moving direction of the subject 20 based on the images captured by a plurality of imaging devices for movement detection. In this example, those imaging devices image the subject 200 in the downward direction. Thus, based on the change of the position of the subject 200 in the moving image captured by the imaging device for movement detection, the moving direction of the subject 200 can be detected easily with high accuracy.

Then, the selection unit 40 selects one of the imaging devices 10, that is to capture an authentication image of the subject 200, based on the moving direction detected by the direction detection unit 30, as described before.

The selection unit 40 may select the first and second imaging devices from the imaging devices 10 serving as the imaging devices for authentication based on the moving direction detected by the direction detection unit 30. The first imaging device captures the first authentication image of the subject 200, while the second imaging device is provided behind the first imaging device in the moving direction of the subject 200 and captures the second authentication image of the subject 200. The first imaging device is the imaging device 10 provided in a path through which the subject 200 as a passerby passes, while the second imaging device is the imaging device 10 provided in that path of the subject 200 at a position through which the passerby passes after passing through the position of the first imaging device. Moreover, the selection unit 40 may select the second imaging device based on the moving image captured by the imaging device 10 selected as the first imaging device.

In this case, it is preferable that the imaging device 10 selected as the second imaging device images the subject 200 with the larger amount of information than the imaging device 10 selected as the first imaging device. In this description, the "larger amount of information" means that the amount of information for carrying out authentication is larger. More specifically, an image with the larger amount of information means an image captured with higher resolution, an image captured at a larger magnification, an image captured in a direction closer to the frontal direction of the subject, an image containing a region of the subject that is suitable for authentication, and the like. For example, the first imaging device may image the entire facial region of the subject 200, and the second imaging device may image an eye of the subject 200 while enlarging the eye. Moreover, the first imaging device may image a front view of the subject 200 as the first authentication image and the second imaging device may image another view of the subject 200 as the second authentication image at an angle different from the angle of the first imaging device.

In addition, the first imaging device may capture the first authentication image of the subject 200 in a direction approximately parallel to the path of the subject 200, while the second imaging device may capture the second authentication image of the passerby at an angle different from that of the first imaging device. Please note that the direction approximately parallel to the path of the subject is a direction approximately parallel to a moving direction of the passerby on the path.

Furthermore, the first imaging device may include a color filter in which adjacent pixels have different colors so as to capture a color image as the first authentication image, while the second imaging device may be a device that includes no color filter so as to capture a monochrome image as the second authentication image. In this case, the second imaging device can capture an image with higher resolution. For example, the first imaging device includes imaging elements of R, G and B in a sprite pattern, and the second imaging device includes monochrome imaging elements. In this case, even if the pitch of the imaging elements in the first imaging device is the same as that in the second imaging device, the second imaging device can have a resolution approximately three times higher than that of the first imaging device.

The authentication unit 70 carries out primary authentication of the subject 200 based on the first authentication image captured by the first imaging device and then carries out secondary authentication of the subject 200 based on the second authentication image captured by the second imaging device.

The authentication unit 70 may carry out primary authentication based on the image captured by the imaging device for movement detection and carry out secondary authentication based on the image captured by the imaging device for authentication. In other words, the imaging device for movement detection may be used as the first imaging device while the imaging device for authentication may be used as the second imaging device. In this case, the direction detection unit 30 and the authentication unit 70 carry out detection of the direction of the subject 200 and primary authentication in parallel based on the image captured by one imaging device 10 that works as both the imaging device for movement detection and the first imaging device. Such an operation enables authentication of the subject 200 to be carried out more efficiently.

Figure 4:
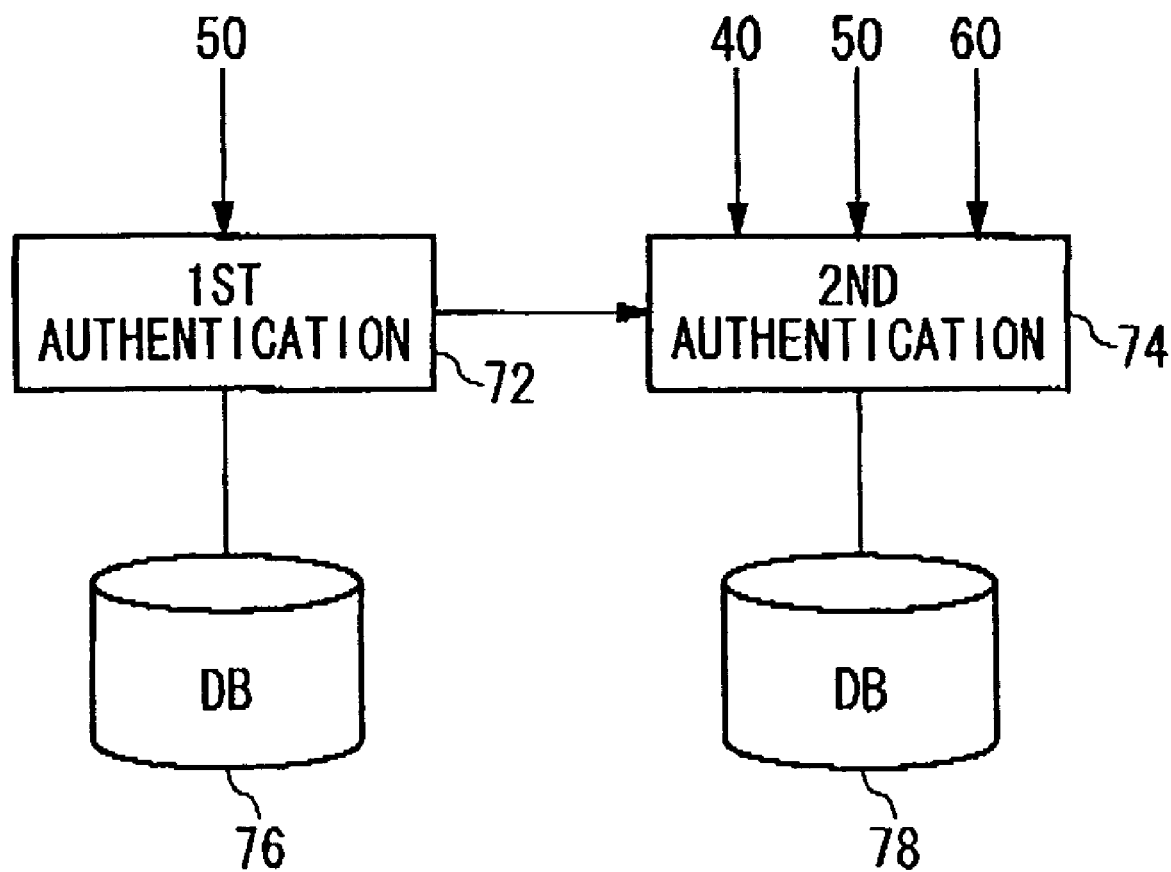
FIG. 4 is a diagram of an exemplary structure of an authentication unit 70.

FIG. 4 is a diagram of an exemplary structure of the authentication unit 70. The authentication unit 70 includes the first authentication unit 72, the second authentication unit 74, the first authentication database 76 and the second authentication database 78.

The first authentication unit 72 carries out primary authentication of the subject 200 based on the first authentication image. The first authentication database 76 stores the first registered images of a plurality of subjects 200 in advance. The first authentication unit 72 compares the first registered images stored in the first authentication database 76 with the first authentication image, thereby carrying out primary authentication of the subject 200.

The second authentication unit 74 carries out secondary authentication of the subject 200 based on the result of the authentication carried out by the first authentication unit 72 and the second authentication image, Please note that secondary authentication is more accurate than primary authentication. For example, the second authentication database 78 stores the second registered images each containing the larger amount of information than the first registered images. The second authentication unit 74 compares the second authentication image that is larger in the amount of information than the first authentication image with the second registered images stored in the second authentication database 78, thereby carrying out secondary authentication of the subject 200.

The first authentication unit 72 may extract a plurality of candidates of the subject 200 based on the first authentication image. For example, the fist authentication unit 72 compares the first authentication image with the first registered images stored in the first authentication database 76, extracts a plurality of candidate images that resemble the first authentication image from the first registered images, and notifies the second authentication unit 74 of information about the extracted candidate images. Then, the second authentication unit 74 determines the subject 200 from the candidates extracted by the first authentication unit 72 based on the second authentication image. For example, the second authentication database 78 stores the second registered images that are respectively associated with the first registered images stored in the first authentication database 76. The second authentication unit 74 compares the second authentication image with the second registered images respectively corresponding to the candidate images extracted by the first authentication unit 72, extracts an extracted image showing the subject 200 from those second registered images, and determine who the subject 200 is.

By the above-described operation, it is possible to carry out the first authentication as preliminary authentication during a time period from the capturing of the subject 200 by the first imaging device to the capturing of the subject 200 by the second imaging device. Thus, a time required for the second authentication can be shortened. In other words, it is possible to carry out efficient and accurate authentication by carrying out the first authentication as preliminary authentication while the subject 200 is moving to a position where final authentication is to be carried out, and then carrying out the second authentication using the result of the first authentication.

The second authentication unit 74 may change a criterion for the second authentication in accordance with the result of the first authentication by the first authentication unit 72. For example, the first authentication unit 72 calculates degrees of coincidence between the first registered images and the first authentication image and notifies the second authentication unit 74 of the calculated degrees of coincidence. The second authentication unit 74 carries out secondary authentication of the subject 200 further based on the degrees of coincidence thus calculated. In this case, the second authentication unit 74 changes the criterion for authentication in secondary authentication based on the degrees of coincidence calculated by the first authentication unit 72.

For example, the second authentication unit 74 calculates the degree of coincidence between the second registered image and the second authentication image, and authenticates the subject 200 is a person corresponding to the second registered image in a case where the degree of coincidence thus calculated is larger than a reference value supplied in advance. The second authentication unit 74 changes that reference value in accordance with the degree of coincidence calculated by the first authentication unit 72. For example, the reference value may be changed in inverse proportion to the thus calculated degree of coincidence. Such an operation enables secondary authentication to be carried out more efficiently.

In a case where the degree of coincidence in the first authentication unit 72 is smaller than a predetermined value, the second authentication unit 74 may carry out authentication of the subject 200 based on images of a plurality of regions of the subject 200. For example, in a case where the degree of coincidence in the first authentication unit 72 is equal to or larger than the predetermined value, the second imaging device only captures an image containing an eye of the subject 200 and the second authentication unit 74 carries out authentication of the subject 200 based on the thus captured image of the eye. In a case where the degree of coincidence in the first authentication unit 72 is smaller than the predetermined value, the second imaging device images a plurality of regions of the subject 200, and the second authentication unit 74 carries out authentication of the subject 200 based on the images of those regions.

Moreover, the second authentication unit 74 may compare the second authentication image with the second registered images so as to calculate the degree of coincidence between the subject 200 in the second authentication image and the candidate in each of the second registered images, further acquire a characteristic of the subject 200 that is different from the characteristic in the second authentication image in a case where there are a plurality of candidates having the degrees of coincidence equal to or larger than the predetermined value, and determine the subject 200 from those candidates based on the acquired characteristic of the subject 200. The structure of the second authentication unit 74 in this case will be described later, referring to FIG. 8.

The decision unit 60 described referring to FIG. 2 may determine whether or not the subject in the second authentication image is coincident with the subject in the first authentication image and notify the second authentication unit 74 of the determination result. In this case, the second authentication unit 74 carries out secondary authentication in a case where the decision unit 60 determined that both subjects were coincident with each other. The decision unit 60 may determine whether or not both subjects are coincident, for example, by comparing the image of the subject in the first authentication image with the image of the subject in the second authentication image.

The first and second imaging devices may receive subject identification information for identifying the subject 200 in a case where they imaged the subject 200. For example, the subject 200 may include an IC chip that transmits the subject identification information to the outside and the first and second imaging devices may receive the subject identification information transmitted from the IC chip. The first and second imaging devices store the captured images and the subject identification information in the storage unit 50 so as to be associated with each other. The decision unit 60 determines whether or not the subject in the image captured by the first imaging device is coincident with that in the image captured by the second imaging device based on the subject identification information. Such an operation can omit redundant authentication and can further improve the efficiency of secondary authentication.

The second authentication unit 74 may carry out authentication of the subject 200 further based on a time from the capturing of the subject 200 by the first imaging device to the capturing of the subject 200 by the second imaging device. For example, the second authentication unit 74 may carry out authentication of the subject 200 in a case where that time is shorter than a predetermined time. In other words, in a case where a time in which the subject 200 moves from the first imaging device to the second imaging device is unreasonably long, the second authentication unit 74 does not have to carry out authentication of the subject 200. Moreover, the second authentication unit 74 may calculate a distance between the first imaging device and the second imaging device based on the positions of the first and second imaging devices and select whether to carry out authentication of the subject 200 based on the thus calculated distance and the above-described time.

In addition, the second authentication unit 74 may carry out secondary authentication of the subject 200 based on imaging-device identification information for identifying the second imaging device. For example, in a case where the second imaging device is provided at an entrance where it is determined whether to give admittance to the subject 200 based on the authentication result in the second authentication unit 74, and people who obtained admittance were registered for each entrance, the second authentication unit 74 identifies the entrance at which the second imaging device is provided based on the imaging-device identification information on the second imaging device. Then, the second authentication unit 74 determines whether or not the subject 200 is one of the people who gained admittance for that entrance.

Furthermore, a plurality of second imaging devices may capture the second authentication images of the subject 200 at different angles, respectively. In this case, it is preferable that groups of imaging devices each of which is formed by a plurality of second imaging devices for imaging the subject 200 at different angles, respectively, be provided at respective positions where the second authentication is to be carried out. The selection unit 40 selects any one of the groups of imaging devices and makes the selected group image the subject 200. The second authentication unit 74 carries out the second authentication of the subject 200 based on the second authentication images of the subject 200 respectively captured at different angles. For example, registered images respectively captured at different angles were supplied to the second authentication unit 74 in advance, and a plurality of second imaging devices image the subject 200 at those angles, respectively. By performing such a control, authentication of the subject 200 can be carried out more accurately.

Figure 5A:
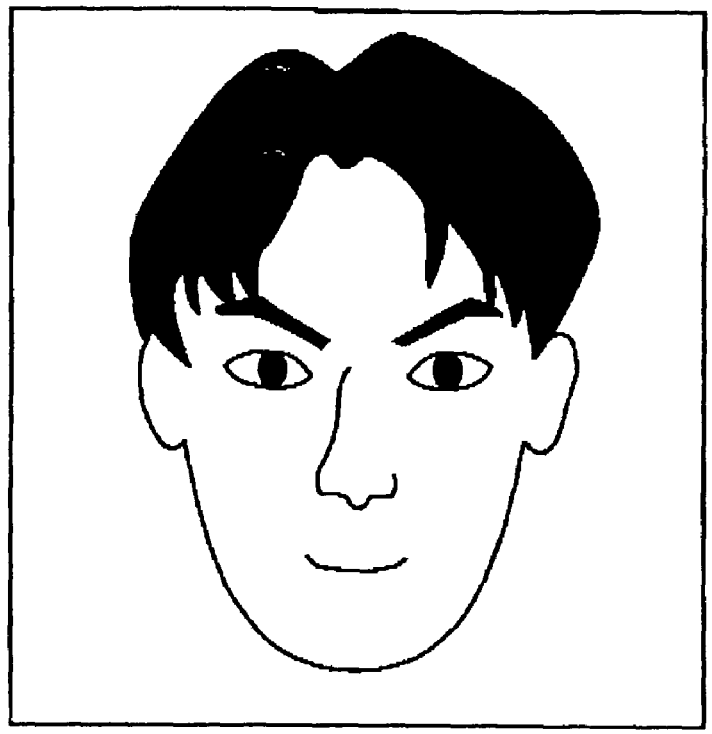
FIG. 5A shows an exemplary image for the first authentication.
Figure 5B:
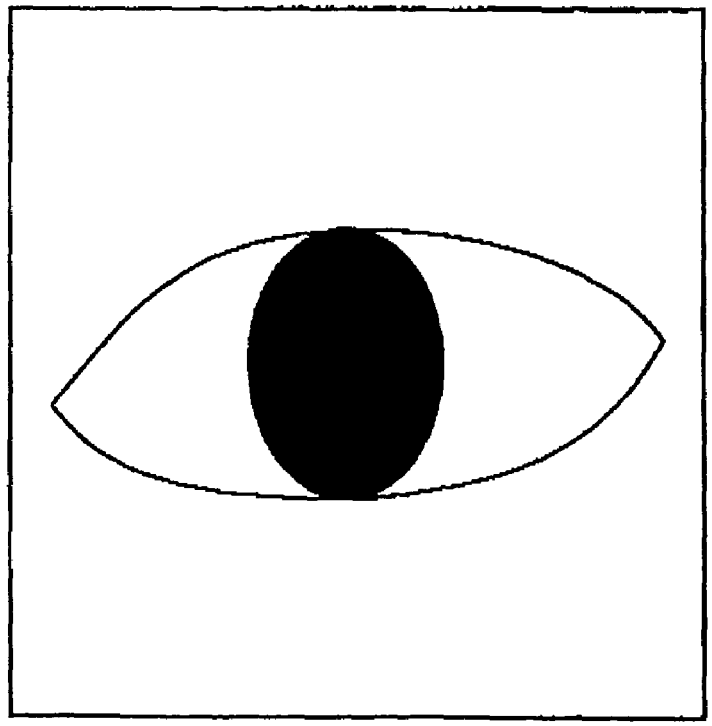
FIG. 5B shows an exemplary image for the second authentication.

FIGS. 5A and 5B show an exemplary first authentication image and an exemplary second authentication image, respectively. The first imaging device images a region of the subject 200, that corresponds to the first registered image stored in the first authentication database 76. In this example, the first imaging device images the entire facial region of the subject 200, as shown in FIG. 5A.

The second imaging device images a region of the subject 200, that corresponds to the second registered image stored in the second authentication database 78. The second imaging device preferably images the region of the subject 200 corresponding to the second registered image while enlarging it at a larger magnification than that of the image captured by the first imaging device. In this example, the second imaging device images a region of the subject 200 containing an eye while enlarging it, as shown in FIG. 5B. It is preferable that the second imaging device be provided at a position that is suitable for imaging the eye of the subject 200. For example, the second imaging device may be provided at substantially the same height as that of the eye of the subject 200.

Moreover, the second authentication unit 74 compares irises in the second registered images obtained by imaging eyes of a plurality of subjects with an iris in the second authentication image, thereby determining who the subject 200 is.

The first authentication unit 72 may extract a region of the subject 200, that is to be used for secondary authentication of the subject 200, based on the first authentication image. For example, in a case where the subject 200 wears sunglasses, a mask or the like and therefore an eye, a mouth or the like of the subject 200 cannot be detected, the first authentication unit 72 notifies the second imaging device and the second authentication unit 74 that another region of the subject 200 is to be used for secondary authentication. Then, the second imaging device images the region of the subject 200 thus extracted by the first authentication unit, as the second authentication image. Then, the second authentication unit 74 carries out authentication of the subject 200 based on the second authentication image. By performing such an operation, authentication of the subject 200 can be carried out efficiently.

Figure 6:
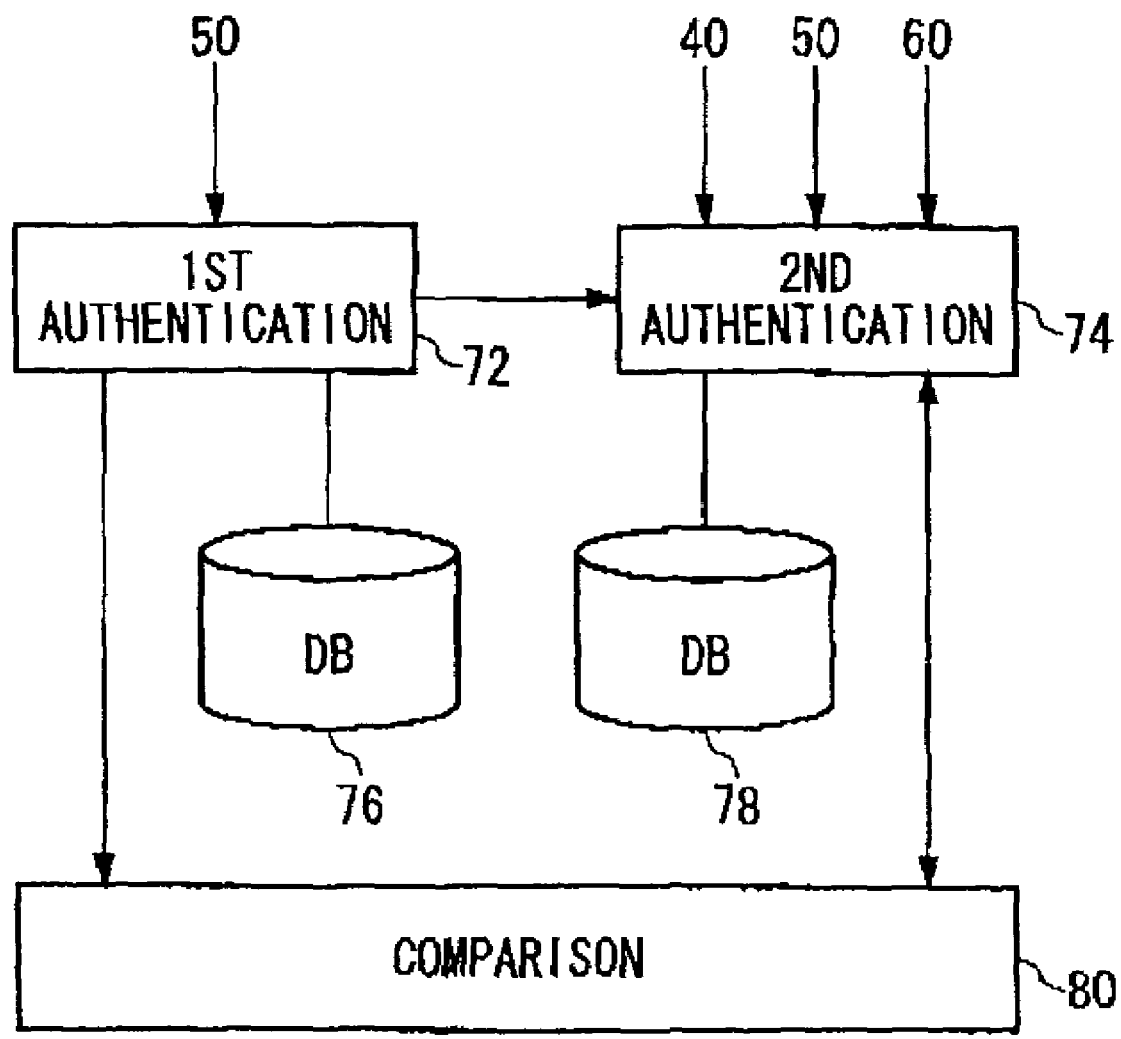
FIG. 6 is a diagram of another exemplary structure of the authentication unit 70.

FIG. 6 is a diagram of another exemplary structure of the authentication unit 70. The authentication unit 70 in this example determines whether or not the subject 200 in the second authentication image is coincident with the subject 200 in the first authentication image, and carries out the second authentication using the second authentication image in accordance with the result of the above determination, as described before. The authentication unit 70 in this example includes the structure of the authentication unit 70 shown in FIG. 4 and further includes a comparison unit 80. Except for the comparison unit 80, components in FIG. 6 have the same or similar functions and structures as/to those labeled with the same reference numerals in FIG. 4.

The comparison unit 80 determines whether or not the subject 200 in the second authentication image is coincident with the subject 200 in the first authentication image. This determination maybe carried out based on subject identification information transmitted by an IC chip or by comparing the image of the subject in the first authentication image with that in the second authentication image, as described before. The comparison unit 80 stores the first authentication image and the second authentication image so as to be associated with each other, in a case where it was determined that the same subject was captured in both the first and second authentication images.

Then, the second authentication unit 74 extracts the first authentication image associated with each of the second authentication images supplied thereto, from the first authentication images stored in the comparison unit 80, and determines the subject 200 from the candidates extracted for the thus extracted first authentication image by the first authentication unit 72, using the corresponding second authentication image. Thus, even in a case where a plurality of passersby are imaged as subjects 200 sequentially, for example, authentication of each subject 200 can be carried out efficiently. In addition, even if an order in which the subjects 200 pass by the first imaging device is different from an order in which they pass by the second imaging device, authentication of each subject 200 can be carried out efficiently.

Moreover, the first imaging device may further capture the first compared images in which the respective subjects 200 are imaged in an area wider than that in the second authentication images so as to correspond to the first authentication images. In other words, for each subject 200, the first authentication image and the first compared image may be captured so as to be associated with each other. In addition, the second imaging device may further capture the second compared images in which the respective subjects 200 are imaged in an area wider than that in the second authentication images so as to correspond to the second authentication images. In other words, for each subject 200, the second authentication image and the second compared image may be captured so as to be associated with each other.

In this case, the comparison unit 80 compares the subject 200 in the first compared image with the subject 200 in the second compared image, and, in a case where those subjects 200 are the same, determines that the subject 200 in the corresponding first authentication image and the subject 200 in the corresponding second authentication image are the same.

Figure 7A:
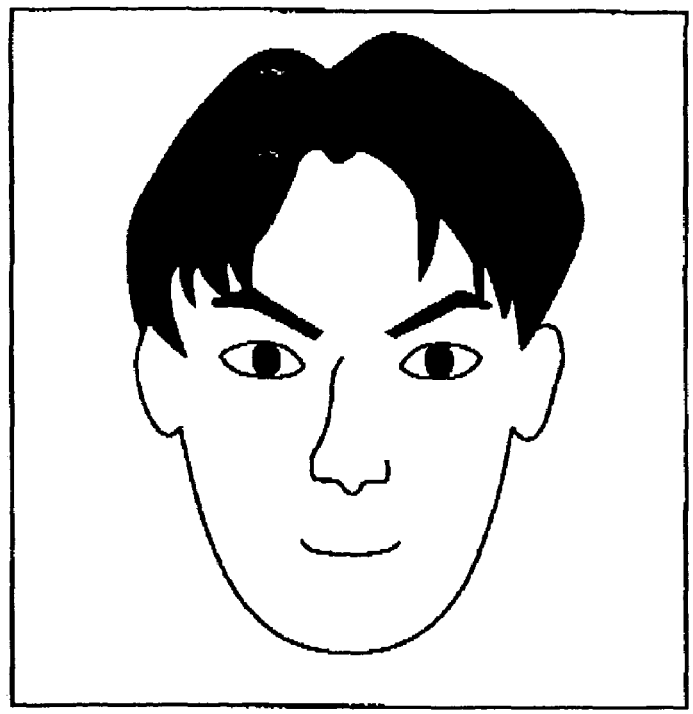
FIGS. 7A and 7B show an example of authentication image and compared images.
Figure 7B:
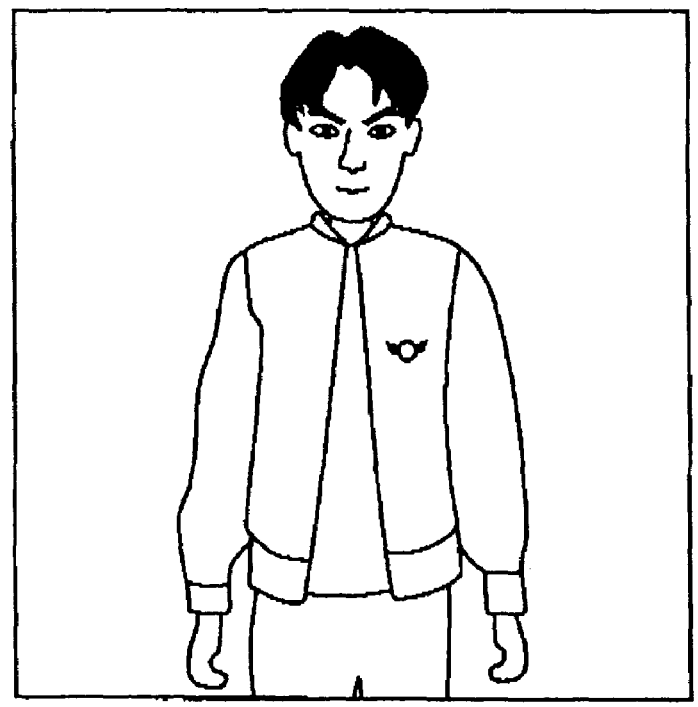

FIGS. 7A and 7B show an exemplary authentication image and an exemplary compared image. FIG. 7A shows an exemplary second authentication image and FIG. 7B shows an example of the first or second compared image. As described before, the first and second imaging devices respectively capture the first and second compared images of the subject which contain a wider area than that in the second authentication image. Please note that the wider area means that an imaging magnification of the subject 200 in the compared image is smaller than that of the subject 200 in the second authentication image, for example. The second authentication image is an image containing the facial region of the subject 200 and each compared image is an image of the subject 200 from the waist up, for example. It is preferable that approximately the same region of the subject 200 be imaged in the first and second compared images.

By performing comparison of the subjects 200 using the compared images of the wider region in that manner, the comparison of the subjects 200 can be easily performed. For example, the comparison unit 80 may compare the subjects 200 by comparing clothes of the subjects 200 in the respective compared images. Since the first and second compared images are typically captured on the same date, the same clothes are imaged in the first and second compared images of the same subject 200. Thus, by comparing print patterns of the clothes or the like, the first and second compared images in which the same subject 200 is imaged can be extracted very easily. Therefore, it is possible to carry out authentication of each subject 200 efficiently.

In a case where a plurality of subjects 200 were imaged in a single first authentication image, the first authentication unit 72 extracts candidates for each of the subjects 200. The comparison unit 80 may compare each subject 200 in the first authentication image with the subject 200 imaged in each second authentication image in the aforementioned manner. In this case, it is preferable that the second imaging device captures the second authentication image for each of the subjects 200 in the first authentication image.

The first authentication unit 72 extracts candidates for each subject 200. The second authentication unit 74 then determines the subject 200 from the candidates that were extracted by the first authentication unit 72 for the subject 200 corresponding to each of the second authentication images.

Figure 8:
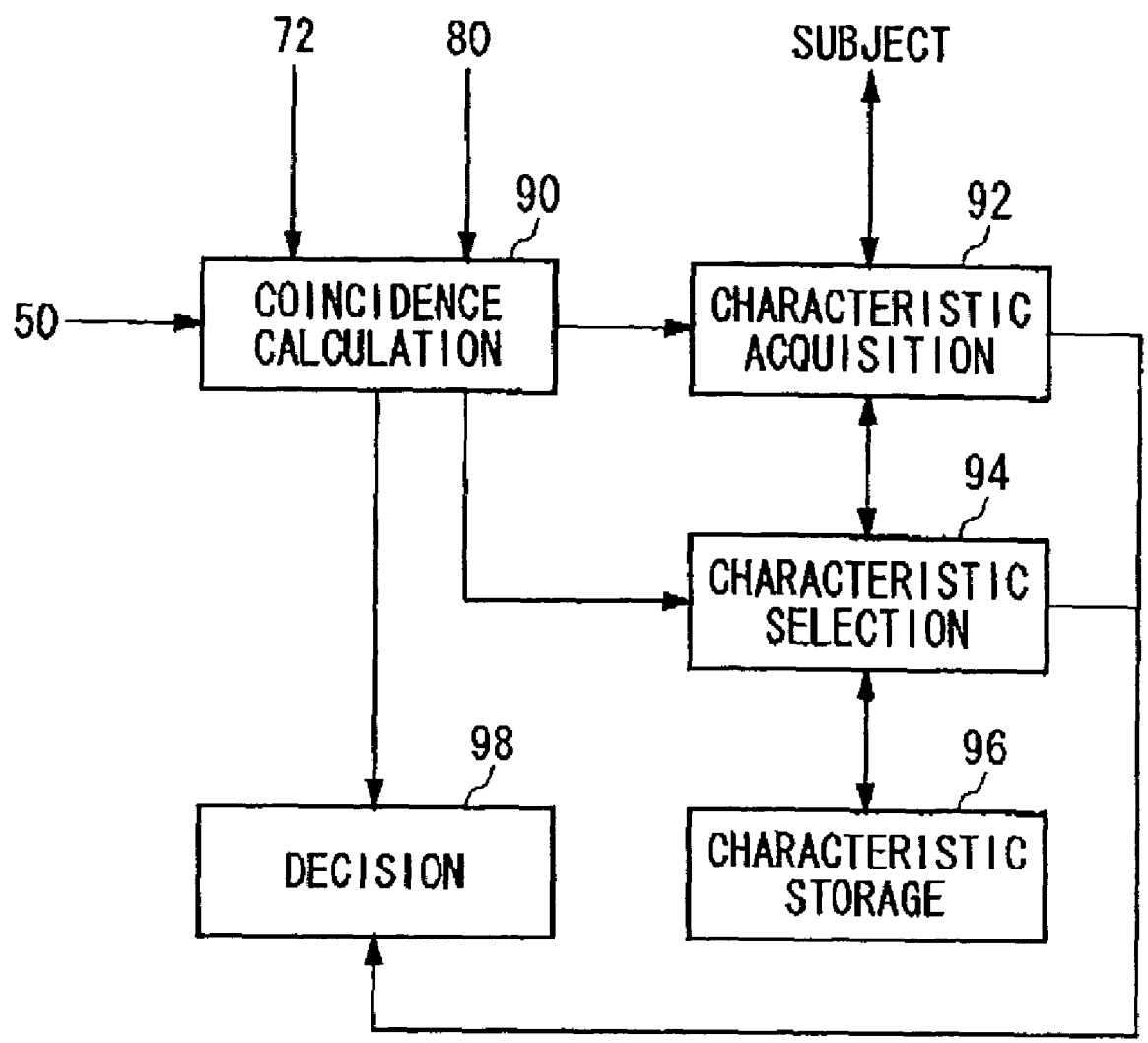
FIG. 8 is a diagram of an exemplary structure of the second authentication unit 74.

FIG. 8 is a diagram of an exemplary structure of the second authentication unit 74. As described before, the second authentication unit 74 in this example calculates the degrees of coincidence between the subject 200 in the second authentication image and the candidates, and carries out secondary authentication in accordance with the degrees of coincidence. The second authentication unit 74 includes a coincidence calculation unit 90, a characteristic acquisition unit 92, a characteristic selection unit 94, a characteristic storage unit 96 and a decision unit 98.

The coincidence calculation unit 90 calculates the degree of coincidence between the subject 200 in each second authentication image and each of candidates included in a candidate group that is given to correspond to that subject 200. The candidate groups were narrowed down in advance for the respective subjects 200 by the first authentication unit 72, as described before. It is instructed from the comparison unit 80 which one of the candidate groups is to be used, as described referring to FIG. 6. The coincidence calculation unit 90 compares a registered image for the second authentication, that was given in advance to each candidate, with the second authentication image, thereby calculating the degree of coincidence between them.

The characteristic acquisition unit 92 further acquires a characteristic of the subject 200 that is different from the characteristic in the second authentication image, in a case where there are a plurality of candidates for that subject 200 each having the calculated degree of coincidence equal to or larger than a predetermined value. For example, the characteristic acquisition unit 92 may make the second imaging device image a different site of the subject 200 from the site imaged in the second authentication image and/or may further acquire audio information on the subject 200.

The characteristic storage unit 96 stores for each candidate of the subject 200 a plurality of authentication characteristics and a characteristic amount of each authentication characteristic in advance in such a manner that each authentication characteristic is associated with its characteristic amount. The authentication characteristic and its characteristic amount are stored to be associated with the corresponding candidate. As described before, the characteristic storage unit 96 may store an image for authentication obtained in advance by imaging a different site of the subject 200 from the site in the second registered image to be compared with the second authentication image or may store audio information for authentication of the subject 200. Moreover, as the authentication characteristic, an image of the subject 200 that was captured at a different angle or a color or monochrome image of the subject 200 may be stored.

The characteristic amount of the authentication characteristic is a value indicating the degree of easiness of distinguishing that authentication characteristic from another authentication characteristic in a case of comparing that authentication characteristic with the other authentication characteristic, and may be a value indicating the amount of features for distinguishing that authentication characteristic from the other authentication characteristic. For example, in a case where the authentication characteristic is audio information, the characteristic amount may be a value indicating the number of characteristic pronunciations in that authentication characteristic or the like, or may be a value indicating how much characteristic the characteristic pronunciation of one subject is as compared with that characteristic pronunciation of another subject.

The characteristic selection unit 94 selects one of the authentication characteristics, that is associated with the characteristic amount having the maximum variance between the candidates each having the degree of coincidence equal to or larger than the predetermined value. That is, the characteristic selection unit 94 extracts authentication characteristics stored in advance for all of those candidates from the authentication characteristics stored in the characteristic storage unit 96, and then calculates the variance of the characteristic amount between a plurality of candidates for each of the extracted authentication characteristics. The variance of the characteristic amount of each authentication characteristic is given by a statistic expression, for example. The characteristic selection unit 94 makes the characteristic acquisition unit 92 acquire the characteristic in accordance with the selected authentication characteristic.

Then, the decision unit 98 determines the subject 200 from the candidates each having the degree of coincidence equal to or larger than the predetermined value based on the result of comparison of the characteristic acquired by the characteristic acquisition unit 92 and the authentication characteristic selected for the candidates by the characteristic selection unit 94. By performing such a control, it is possible to carry out authentication of the subject 200 more accurately.

Figure 9:
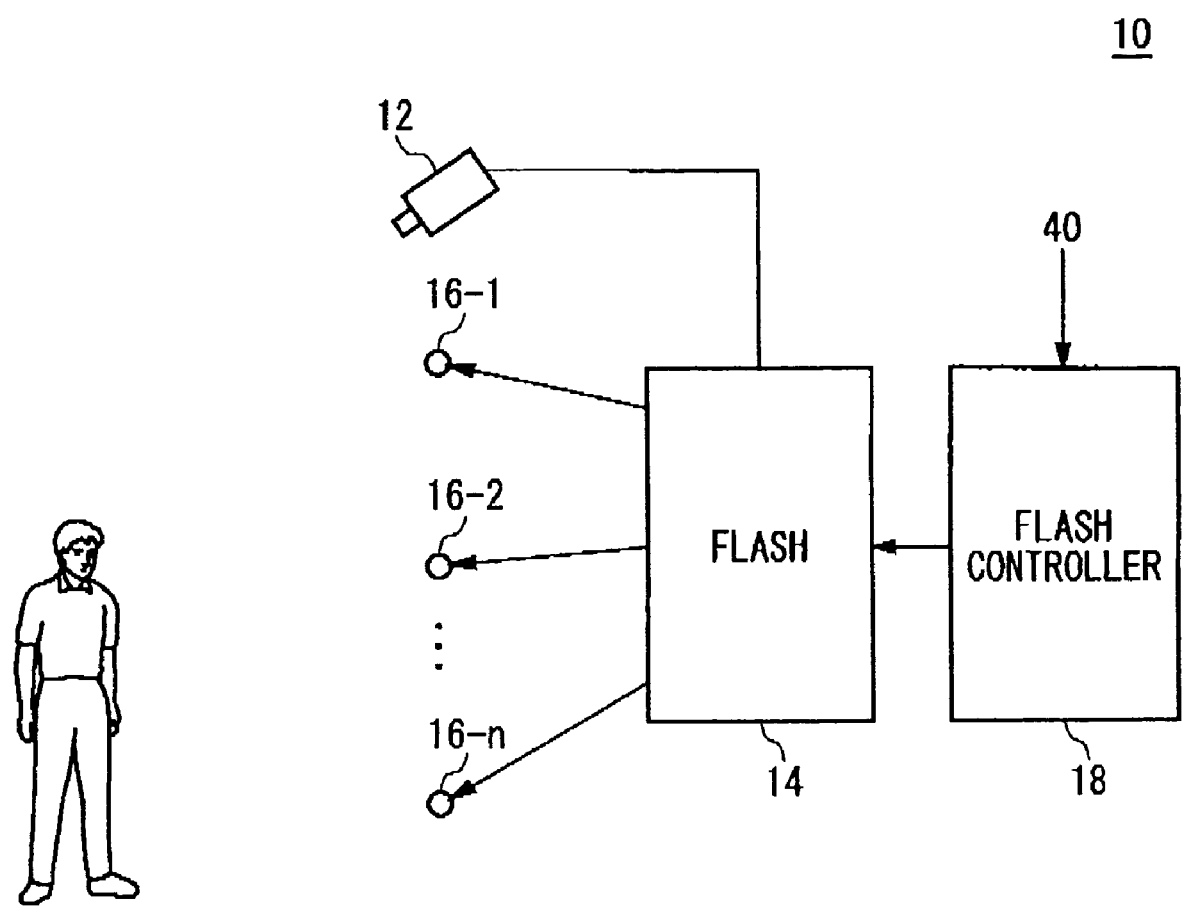
FIG. 9 is a diagram of an exemplary structure of the imaging device 10.

FIG. 9 is a diagram of an exemplary structure of the imaging device 10. In this example, the second imaging device has this structure. The imaging device 10 includes an imaging unit 12, a flash 14 and a flash controller 18. In this example, the imaging unit 12 is a device for capturing a still image of a subject 200. The flash 14 emits light toward the subject 200 from a plurality of positions (16-1, . . . 16-n) in synchronization with the capturing operation of the imaging unit 12. The flash controller 18 controls the position at which the flash 14 emits light.

In a case where the imaging device 10 is the second imaging device, the flash controller 18 may control the position at which the flash 14 emits light based on the result of authentication by the first authentication unit 72 described referring to FIG. 4. In this case, the first authentication unit 72 calculates the position at which the flash 14 is to emit light based on the position, the frontal direction or the like of the subject 200 in the first authentication image and notifies the flash controller 1B of the calculated position via the selection unit 40.

For example, the first authentication unit 72 calculates the height of the subject 200 based on the position of the subject 200 in the first authentication image and then calculates the position in the height direction, at which the flash 14 is to emit light, based on the thus calculated height of the subject 200. That is, the first authentication unit 72 calculates the height of the region of the subject 200 to be imaged as the second authentication image based on the height of the subject 200, and then calculates the position at which the flash 14 is to emit light based on the calculated height.

The first authentication unit 72 also calculates a position in a transverse direction perpendicular to the height direction, at which the flash 14 is to emit light, based on the frontal direction of the subject 200 in the first authentication image. By performing such an operation, it is possible to emit flashlight at the optimum position when the second authentication image of the subject 200 is captured.

The controller 20 may further control the intensity of the light emitted by the flash 14 based on the result of authentication by the first authentication unit 72. In a case where the second authentication unit 74 carries out the second authentication based on an image of an eye of a subject 200 and the first authentication unit 72 determined that the subject 200 in the first authentication image wore sunglasses or the like, for example, the controller 20 increases the intensity of the light emitted by the flash 14.

The first authentication unit 72 may detect brightness in the first authentication image and the flash controller 18 may control the position at which the flash 14 emits light and/or the intensity of that light based on the detected brightness in the first authentication image. In a case where the brightness in the first authentication image is low, for example, the flash 14 increases the intensity of the light emitted by the flash 14. In a case where the brightness in an upper part of the first authentication image is low, for example, the position at which the flash 14 emits light may be elevated.

The first authentication unit 72 may detect brightness or contrast in a region of the subject 200 that is used in authentication by the second authentication unit 74, or a region of the subject 200 that is imaged by the characteristic acquisition unit 92, and the flash controller 18 may control the position at which the flash 14 emits light and/or the intensity of the light emitted by the flash 14 based on the brightness or contrast thus detected. In other words, the flash controller 18 may control the position and/or the intensity of the flash 14 so as to irradiate the aforementioned region of the subject 200 with appropriate light. In a case where the brightness in the head region of the subject 200 in the first authentication image is low, the position at which the flash 14 emits light may be elevated or the intensity of that light may be increased. By performing such an operation, it is possible to emit flashlight having the appropriate intensity from an appropriate position when the second authentication image of the subject 200 is captured.

It is preferable that the imaging unit 12 be capable of imaging the subject 200 from a plurality of heights, as with the flash 14. In this case, the first authentication unit 72 detects the position of the subject 200 in the first authentication image; the second imaging, device calculates the height from which it is to image the subject 200 based on the detected position of the subject 200; and the imaging unit 12 of the second imaging device captures the second authentication image of the subject 200 from the calculated height.

Figure 10:
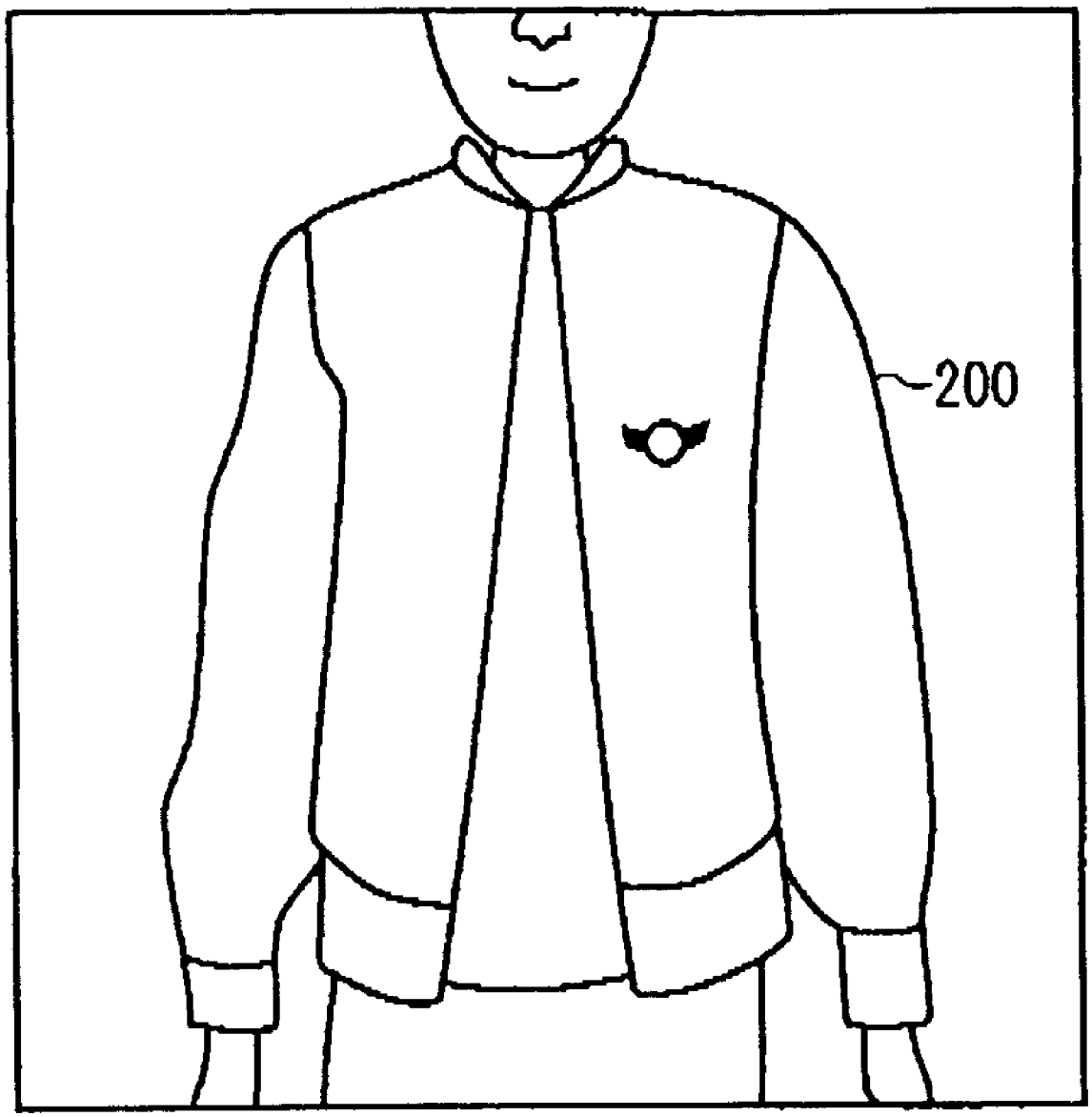
FIG. 10 shows an example of the first authentication image.

FIG. 10 shows an example of the first authentication image. As shown in FIG. 10, in a case where a part of the head region of the subject 200 is not contained in the first authentication image, the second imaging device controls the position of the imaging unit 12 so as to image the entire head of the subject 200. For example, the height of the subject 200 may be determined based on the position of the subject 200 in the first authentication image and then the imaging position of the imaging unit 12 may be controlled in accordance with the thus determined height. Moreover, the position of a region of the subject 200, that is to be used in authentication by the second authentication unit 74, may be determined based on the first authentication image and then the height of the imaging unit 12 in the second imaging device may be controlled so as to allow that region of the subject 12 to be imaged at an appropriate position.

In addition, the first authentication unit 72 may detect an angle at which the first imaging device imaged a passerby (subject 200) based on the first authentication image. In this case, the second imaging device calculates an angle at which the second imaging device is to image the subject 200 based on the angle detected by the first authentication unit 72, and then captures the second authentication image of the subject 200 at the thus calculated angle. In a case where the first and second imaging devices are provided at positions where they can image a front view of the subject 200, for example, when the front view of the subject 200 is not contained in the first authentication image, the first authentication unit 72 detects the angle at which the first authentication image of the subject 200 was taken and then the second imaging device determines the angle at which it images the subject 200 based on the thus detected angle. It is preferable that the imaging unit 12 of the second imaging device be capable of imaging the subject 200 at a desired angle from a desired position.

Figure 11:
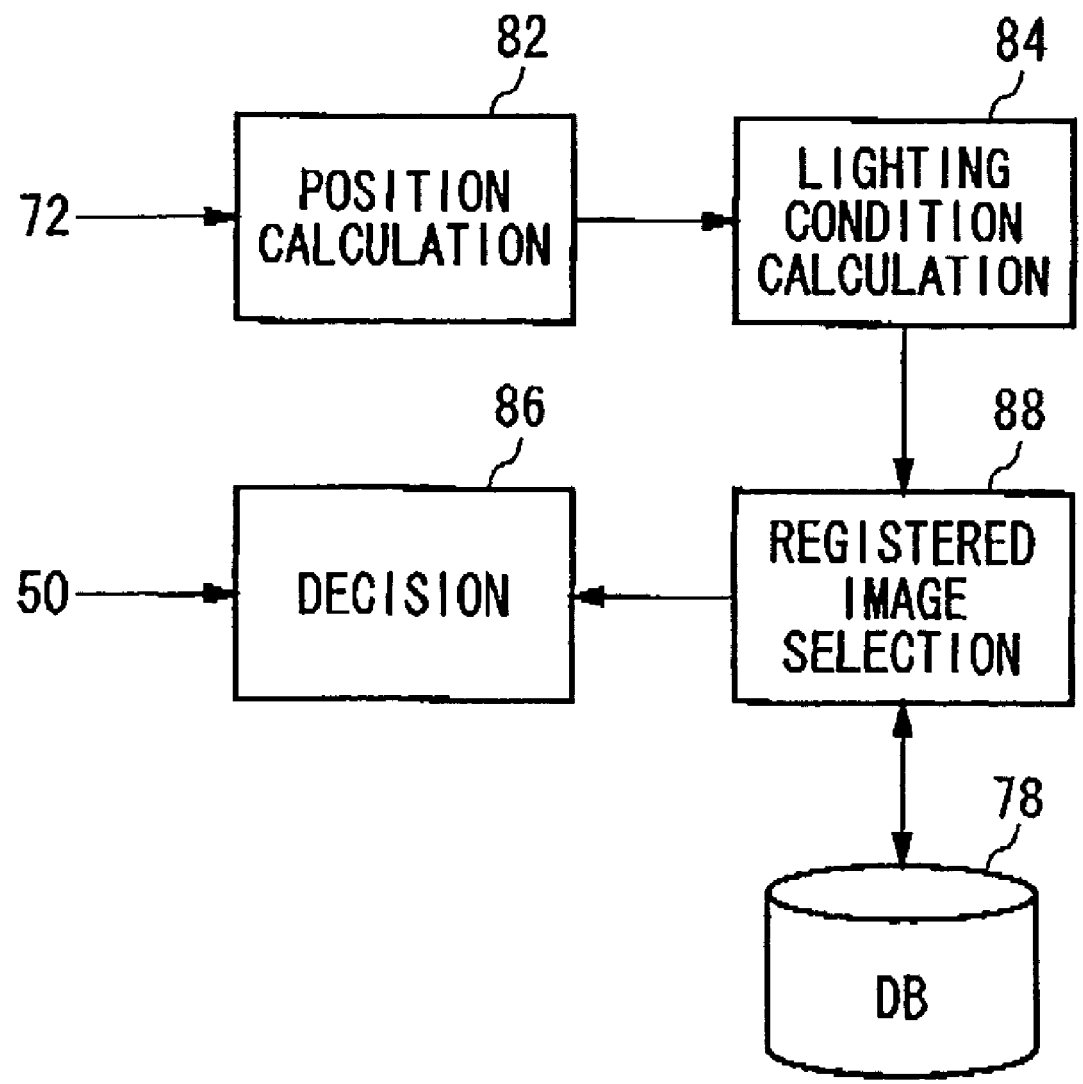
FIG. 11 is a diagram of another exemplary structure of the second authentication unit 74.

FIG. 11 is a diagram of another exemplary structure of the second authentication unit 74. The second authentication unit 74 carries out the second authentication based on a registered image that depends on a lighting condition of the second authentication image. For example, the lighting condition may be calculated based on the position of the flash 14 of the second imaging device, the position of the subject 200, or the like. The lighting condition means the intensity and/or angle of light with which the subject 200 is irradiated in this description.

The second authentication unit 74 includes a position calculation unit 82, a lighting condition calculation unit 84, a decision unit 86 and a registered image selection unit 88. The second authentication unit 74 may further include the second authentication database 78 as a registered image database. The second authentication database 78 stores for each subject 200 a plurality of registered images that were taken under different lighting conditions in advance.

The position calculation unit 82 calculates the position of the subject 200 when the second imaging device images the subject 200, based on the first authentication image. For example, the first and second imaging devices are provided in a straight path on the front side and the back side, respectively, in such a manner that their positions are the same in both the transverse direction and height direction. The position calculation unit 82 calculates a relative position of the subject 200 with respect to the first imaging device when the first imaging device imaged the subject 200 based on the first authentication image. The position calculation unit 82 then calculates the thus calculated relative position as a relative position of the subject 200 when the second imaging device images the subject 200.

The lighting condition calculation unit 84 calculates a lighting condition when the second imaging device images the subject 200 based on the position of the subject 200 calculated by the position calculation unit 82. For example, the lighting condition calculation unit 84 may detect which side of the path the subject 200 is walking on based on the first authentication image and then calculate the lighting condition when the second authentication image is captured. In this case, it is preferable to give the orientation and intensity of light emitted toward the subject 200 in advance when the second authentication image is captured. The lighting condition when the second authentication image is captured can be calculated from the walking position of the subject 200 and the orientation and intensity of the light. Then, the registered image selection unit 88 selects a registered image in accordance with the lighting condition calculated by the lighting condition calculation unit 84. The decision unit 86 compares the second authentication image stored in the storage unit 50 with the thus selected registered image, thereby authenticating the subject 200 in the second authentication image.

For example, an angle of light emitted toward the subject 200 when the authentication image is captured is different depending on which side of the path the subject 200 is walking on. However, since the second authentication unit 74 of this example can select the registered image in accordance with the lighting condition for the subject 200, it can authenticate the subject 200 with high accuracy. Moreover, by determining the lighting condition in advance based on the first authentication image during a time period from the capturing of the first authentication image to the capturing of the second authentication image, it is possible to select the registered image in advance in accordance with the lighting condition. Thus, authentication can be carried out efficiently.

Figure 12:
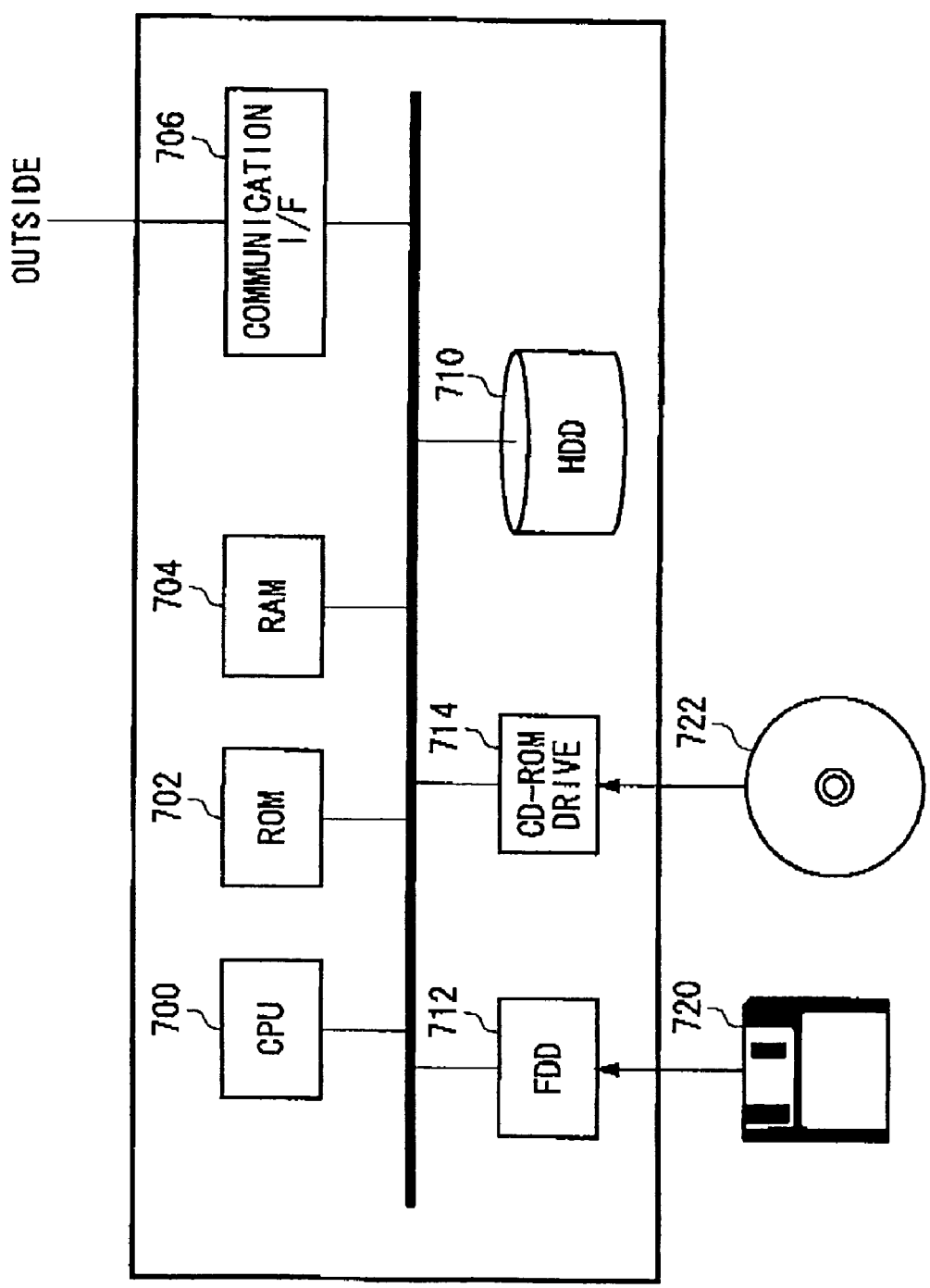
FIG. 12 illustrates an exemplary structure of a computer 300 for controlling the imaging system 100.

FIG. 12 illustrates an exemplary hardware configuration of a computer 300 for controlling the imaging system 100. In this example, the computer 300 stores a program that makes the imaging system 100 work as the imaging system 100 described referring to FIGS. 1-11. The computer 300 may serve as the controller 20 of the imaging system 100.

The computer 300 includes a CPU 700, a ROM 702, a RAM 704, a communication interface 706, a hard disk drive 710, a flexible disk drive 712 and a CD-ROM drive 714. The CPU 700 operates based on a program stored in the ROM 702, the RAM 704, the hard disk drive 710, a flexible disk 720 and/or a CD-ROM 722.

For example, the program for making the imaging system 100 work makes the imaging system 100 work as a plurality of imaging devices 10, the controller 20, the direction detection unit 30, the selection unit 40, the storage unit 50, the decision unit 60 and the authentication unit 70 that were described referring to FIGS. 1-11. That program may make the hard disk drive 710 work as the storage unit 50 and make the CPU 700 work as the direction detection unit 30, the selection unit 40, the decision unit 60 and the authentication unit 70.

The communication interface 706 communicates with the respective imaging devices 10, for example, and receives information related to statuses of the respective imaging devices or the like, captured images, and the like and transmits control signals for controlling the respective imaging devices 10. The hard disk drive 710, the ROM 702, or the RAM 704 as an exemplary storage device stores setting information, a program for making the CPU 700 work, and the like. That program may be stored in a recording medium such as a flexible disk 720 or a CD-ROM 722.

In a case where a flexible disk 720 stores a program, the flexible disk drive 712 reads out the program from the flexible disk 720 and provides it to the CPU 700. In a case where a CD-ROM 722 stores a program, the CD-ROM drive 714 reads out the program from the CD-ROM 722 and provides it to the CPU 700.

The program in the recording medium may be read out directly into the RAM 704 so as to be executed, or may be read out into the RAM 704 so as to be executed after being temporarily installed into the hard disk drive 710. Moreover, the program may be stored in a single recording medium or a plurality of recording media. The program stored in the recording medium may provide the aforementioned functions by cooperation with an operating system. For example, the program may ask the operating system to perform a part or all of the functions and then provide the functions to the operating system based on a response from the operating system.

As the recording medium for storing the program, an optical recording medium such as a DVD and a PD, a magneto-optical recording medium such as an MD, a tape-like medium, a magnetic recording medium, a semiconductor memory such as an IC card and a miniature card, and the like, can be used other than the flexible disk and the CD-ROM.

Although the present invention has been described by way of exemplary embodiments, it should be understood that those skilled in the art might make many changes and substitutions without departing from the spirit and the scope of the present invention which is defined only by the appended claims.

What is claimed is:

1. An imaging system for imaging a subject, comprising:
   a plurality of imaging devices, provided at different positions, respectively, operable to image said subject;
   a direction detection unit operable to detect a moving direction of said subject based on two or more images of said subject taken at different times by one of said plurality of imaging devices;
   a selection unit operable to select one of said plurality of imaging devices, that is to capture an authentication image of said subject, based on said moving direction detected by said direction detection unit and said positions of said plurality of imaging devices;
   a storage unit operable to store said authentication image captured by said selected one of said plurality of imaging devices; and
   an authentication unit operable to authenticate said subject based on said authentication image stored in said storage unit;
   wherein said selection unit detects a frontal direction of said subject based on said moving direction detected by said direction detection unit and selects one of said plurality of imaging devices, that is able to image a front view of said subject, based on said positions of said plurality of imaging devices,
   said selection unit selects said one of said plurality of imaging devices, that is to capture said authentication image of said subject, based on said detected moving direction, said detected moving direction used to calculate a position to which said subject will move to, and based on positional information related to said position of each of said plurality of imaging devices, and
   said selection unit determines which one of said plurality of imaging devices to select by detecting said frontal direction of said subject and determining which one of said plurality of imaging devices is near said calculated position to which said subject will move to based on said positional information related to said position of each of said plurality of imaging devices and is in a position to capture said front view of said subject, said selection unit initializes said one of said plurality of imaging devices to capture said authentication image of said subject.

2. An imaging system as claimed in claim 1, wherein said selected one of said plurality of imaging devices captures a still image of said subject as said authentication image.

3. An imaging system as claimed in claim 1, wherein said plurality of imaging devices include a plurality of imaging devices for movement detection and a plurality of imaging devices for authentication, said imaging devices for movement detection having imaging directions that are parallel to a downward direction, said imaging devices for authentication having imaging directions that are inclined with respect to the downward direction,
said direction detection unit detects said moving direction of said subject based on images of said subject captured by said plurality of imaging devices for movement detection, and
said selection unit selects one of said plurality of imaging devices for authentication, that is to capture said authentication image of said subject.

4. An imaging system as claimed in claim 3, wherein said plurality of imaging devices for movement detection only have imaging directions that are parallel to a downward direction and said plurality of imaging devices for authentication having imaging directions that have at least a horizontal component direction.

5. An imaging system as claimed in claim 4, wherein said imaging devices for movement detection are mutually exclusive from said imaging devices for authentication.

6. An imaging system as claimed in claim 1, wherein said direction detection unit selects whether to detect said moving direction of said subject imaged by said plurality of imaging devices based on whether or not said subject is a subject that was registered in advance.

7. An imaging system as claimed in claim 6, wherein said direction detection unit determines whether said subject is a registered subject having an unique identification of a person registered in a database and selects whether to detect said moving direction of said subject imaged by said plurality of imaging devices based on whether or not said subject is an identified person.

8. An imaging system as claimed in claim 1, wherein said selection unit selects a first imaging device operable to capture a first authentication image of said subject and a second imaging device operable to capture a second authentication image from said plurality of imaging devices based on said moving direction of said subject, said second imaging device being provided behind said first imaging device in said moving direction.

9. An imaging system as claimed in claim 8, wherein said second imaging device images said subject with a larger amount of information than said first imaging device.

10. An imaging system as claimed in claim 9, wherein said authentication unit includes:
a first authentication unit operable to carry out primary authentication of said subject based on said first authentication image captured by said first imaging device; and
a second authentication unit operable to carry out secondary authentication of said subject based on said second authentication image captured by said second imaging device, said secondary authentication being more accurate than said primary authentication.

11. An imaging system as claimed in claim 10, further comprising a comparison unit operable to compare said first authentication image with said second authentication image and, in a case where said subject in said first authentication image and said subject in said second authentication image are the same, associate said first authentication image and said second authentication image with each other, wherein said second authentication unit determines said subject based on said second authentication image from candidates extracted by said first authentication unit based on said first authentication image associated with said second authentication image.

12. An imaging system as claimed in claim 11, wherein said first authentication unit extracts a plurality of candidates from a registry of subjects, each having an unique identification of a person registered in a database, each of said extracted candidates determined to resemble said first authentication image, and
said second authentication unit determines said subject having said unique identification of said person based on said extracted candidates and said second authentication image.

13. An imaging system as claimed in claim 10, wherein said first imaging device further captures a first compared image of said subject containing an area wider than an area in said second authentication image, to correspond to said first authentication image,
said second imaging device further captures a second compared image of said subject containing an area wider than the area in said second authentication image, to correspond to said second authentication image,
said imaging system further comprises a comparison unit operable to compare said first compared Image and said second compared image and, in a case where said subject in said first compared image is the same as said subject in said second compared image, associate said first authentication image corresponding to said first compared image and said second authentication image corresponding to said second compared image with each other, said second authentication unit determines said subject based on said second authentication image from candidates extracted by said first authentication unit based on said first authentication image associated with said second authentication image.

14. An imaging system as claimed in claim 10, wherein, in a case where a plurality of subjects are imaged in said first authentication image,
said first authentication unit extracts candidates for each of said subjects,
said imaging system further comprises a comparison unit operable to associate each of said subjects in said first authentication image with said subject in said second authentication image based on said first authentication image and said second authentication image, and
said second authentication unit determines said subject based on said second authentication image from said candidates extracted by said first authentication unit for said subject in said first authentication image who is associated with said subject in said second authentication image.

15. An imaging system as claimed in claim 14, wherein said second imaging device captures said second authentication image for each of said subjects.

16. An imaging system as claimed in claim 10, wherein said second imaging device includes;
a flash operable to emit light toward said subject at a plurality of positions; and
a flash controller operable to control a position at which said flash emits the light based on a result of the authentication by said first authentication unit.

17. An imaging system as claimed in claim 16, wherein said flash controller further controls intensity of the light emitted by said flash based on the result of the authentication by said first authentication unit.

18. An imaging system as claimed in claim 17, wherein said first authentication unit detects brightness in said first authentication image, and said flash controller controls the intensity of the light emitted by said flash based on the brightness in said first authentication image.

19. An imaging system as claimed in claim 16, wherein said first authentication unit detects brightness in said first authentication image, and said flash controller controls the position at which said flash emits the light based on the brightness in said first authentication image.

20. An imaging system as claimed in claim 16, wherein said position of said flash is adjusted automatically based on said result detected by said first authentication unit in said first authentication image.

21. An imaging system as claimed in claim 10, wherein said second imaging device is capable of imaging said subject from a plurality of heights, said first authentication unit detects a position of said subject in said first authentication image, and said second imaging device calculates a height from which said second imaging device is to image said subject based on the position of said subject detected by said first authentication unit, and images said subject from the calculated height to obtain said second authentication image.

22. An imaging device as claimed in claim 21, wherein said first authentication unit detects an angle at which said first imaging device imaged said subject based on said first authentication image, and said second imaging device calculates an angle at which said second imaging device is to image said subject based on the angle detected by said first authentication unit, and images said subject at the calculated angle to obtain said second authentication image.

23. An imaging device as claimed in claim 21, wherein said height of said second imaging device is automatically adjusted according to said calculated height.

24. An imaging system as claimed in claim 10, wherein said second authentication unit includes:

a registered image database operable to store for each subject a plurality of registered images taken under different lighting conditions in advance;

a position calculation unit operable to calculate a position of said subject when said second imaging device images said subject based on said first authentication image;

a lighting condition calculation unit operable to calculate a lighting condition when said second imaging device images said subject based on the position of said subject calculated by said position calculation unit;

a registered image selection unit operable to select one of said plurality of registered images from said registered image database in accordance with said lighting condition calculated by said lighting condition calculation unit; and a decision unit operable to carry out said secondary authentication of said subject using said selected registered image.

25. An imaging device as claimed in claim 24, wherein, said selected one of said plurality of registered images is selected such that said lighting condition under which said registered image is taken most closely matches said lighting condition calculated by said lighting condition calculation unit.

26. An imaging system as claimed in claim 10, wherein said first imaging device images a front view of said subject as said first authentication image, and said second imaging device images said subject at an angle different from an angle of said first imaging device to obtain said second authentication image.

27. An imaging system as claimed in claim 10, wherein said first imaging device images said subject in a direction approximately parallel to a path of said subject to obtain said first authentication image, and said second imaging device images said subject at an angle different from an angle of said first imaging device to obtain said second authentication image.

28. An imaging system as claimed in claim 10, wherein said first imaging device includes a color filter in which adjacent pixels have different colors to obtain a color image as said first authentication image, and said second imaging device includes no color filter to obtain a monochrome image as said second authentication image.

29. An imaging system as claimed in claim 10, wherein said imaging system comprises a plurality of second imaging devices operable to capture second authentication images of said subject at different angles, respectively, and said second authentication unit carries out said secondary authentication of said subject based on said second authentication images respectively captured by said second imaging devices.

30. An imaging system as claimed in claim 10, wherein said second authentication unit includes a coincidence calculation unit operable to calculate a degree of coincidence between said subject and each of candidates based on said second authentication image;

a characteristic acquisition unit operable to, in a case where there are a plurality of candidates each having said calculated degree of coincidence equal to or larger than a predetermined value, acquire a characteristic of said subject that is different from a characteristic in said second authentication image; and a decision unit operable to determine said subject from said plurality of candidates each having said calculated degree of coincidence equal to or larger than the predetermined value based on said characteristic of said subject acquired by said characteristic acquisition unit.

31. An imaging system as claimed in claim 30, wherein said second authentication unit further includes:

a characteristic storage unit operable to store for each of said candidates a plurality of authentication characteristics and a characteristic amount of each of said authentication characteristics in advance in such a manner that each of said authentication characteristics and its characteristic amount are associated with each other; and a characteristic selection unit operable to select one of said plurality of authentication characteristics that is associated with said characteristic amount having a maximum variance between said plurality of candidates each having said calculated degree of coincidence equal to or larger than the predetermined value, and wherein said characteristic acquisition unit acquires said characteristic of said subject in accordance with said one of said authentication characteristics selected by said characteristic selection unit.

32. An imaging system as claimed in claim 1, wherein said direction detection unit detects said moving direction of said subject based on change in size of said subject in said plurality of images captured by any one of said plurality of imaging devices.

33. An imaging system as claimed in claim 1, wherein said selection unit selects said one imaging device that is able to image the front view of said subject further based on imaging directions of said imaging devices.

34. An imaging system as claimed in claim 1, wherein said selection unit controls an imaging direction of said selected imaging device to image the front view of said subject.

35. An imaging system as claimed in claim 1, further comprising a decision unit operable to determine whether or not said authentication image contains a front view of a facial region of said subject, wherein said authentication unit carries out authentication of said subject based on said authentication image in a case where said decision unit determined that said authentication image contained the front view of said facial region of said subject.

36. An imaging system as claimed in claim 35, wherein said decision unit deletes said authentication image stored in said storage unit in a case where said decision unit determined that no front view of said facial region of said subject was contained in said authentication image.

37. An imaging system as claimed in claim 36, wherein said decision unit automatically deletes said authentication image stored in said storage unit in the case where said decision unit determined that no front view of said facial region of said subject was contained in said authentication image.

38. An imaging system as claimed in claim 1, wherein said positional information of each of said plurality of imaging devices is stored in a database in advance of selecting and initializing said one of said plurality of imaging devices.

39. A computer program product having computer instructions, recorded on a computer readable medium, for enabling a computer executing the computer instructions to perform operations comprising: imaging a subject:

detecting a moving direction of said subject based on two or more images of said subject taken at different times by one of said plurality of imaging devices;

selecting one of said plurality of imaging devices, that is to capture an authentication image of said subject, based on said moving direction detected by said direction detection unit and said positions of said plurality of imaging devices;

storing said authentication image captured buy said selected one imaging device; and authenticating said subject based on said authentication image stored in said storage unit;

wherein said selecting is a detection of a frontal direction of said subject based on said moving direction detected by said direction detection unit and selects one of said plurality of imaging devices, that is able to image a front view of said subject, based on said positions of said plurality of imaging devices, said selecting includes selecting said one of said plurality of imaging devices, that is to capture said authentication image of said subject, based on said detected moving direction, said detected moving direction used to calculate a position to which said subject will move to, and based on positional information related to said position of each of said plurality of imaging devices, and said selecting includes determining which one of said plurality of imaging devices to select by detecting said frontal direction of said subject and determining which one of said plurality of imaging devices is near said calculated position to which said subject will move to based on said positional information related to said position of each of said plurality of imaging devices and is in a position to capture said front view of said subject, and initializing said one of said plurality of imaging devices to capture said authentication image of said subject.

* * * * *